United States Patent
Bennett et al.

(10) Patent No.: US 7,734,137 B2
(45) Date of Patent: Jun. 8, 2010

(54) MULTIPLE CORE MICROSTRUCTURED OPTICAL FIBRE

(75) Inventors: Charlotte R H Bennett, Malvern (GB); Terence J Shepherd, Malvern (GB); Laurent Michaille, Malvern (GB); David M Taylor, Malvern (GB)

(73) Assignee: QinetiQ Limited, London (GB)

( * ) Notice: Subject to any disclaimer, the term of this patent is extended or adjusted under 35 U.S.C. 154(b) by 125 days.

(21) Appl. No.: 11/886,844

(22) PCT Filed: Mar. 23, 2006

(86) PCT No.: PCT/GB2006/001061

§ 371 (c)(1), (2), (4) Date: Sep. 21, 2007

(87) PCT Pub. No.: WO2006/100488

PCT Pub. Date: Sep. 28, 2006

(65) Prior Publication Data

US 2009/0067793 A1    Mar. 12, 2009

(30) Foreign Application Priority Data

Mar. 24, 2005   (GB)   ................................. 0506032.2

(51) Int. Cl.
*G02B 6/02* (2006.01)
*G02B 6/032* (2006.01)
*G02B 6/036* (2006.01)
*C03B 37/02* (2006.01)
*C03B 37/028* (2006.01)
*C03B 37/025* (2006.01)

(52) U.S. Cl. .......................... 385/126; 385/125; 65/393; 65/409; 65/411; 65/412; 65/435

(58) Field of Classification Search ......... 385/123–128, 385/146; 65/385, 393, 409, 411, 412, 435
See application file for complete search history.

(56) References Cited

U.S. PATENT DOCUMENTS 4,389,089 A * 6/1983 Strack .................. 385/116

(Continued)

FOREIGN PATENT DOCUMENTS

EP    1 340 725 A2    9/2003

(Continued)

OTHER PUBLICATIONS

Mafi et al., "Shaping Modes in Multicore Photonic Crystal Fibers," *IEEE Photonics Technology Letters*, vol. 17, No. 2, Feb. 2005, pp. 348-350.

(Continued)

*Primary Examiner*—Daniel Petkovsek
(74) *Attorney, Agent, or Firm*—Nixon & Vanderhye P.C.

(57) ABSTRACT

A multicore optical fibre includes a microstructured cladding material formed from a plurality of cladding elements arranged in an array and each cladding element comprising at least two different materials each having different refractive indices, and a plurality of core elements formed within interstitial regions between adjacent cladding elements. A fibre so formed may have a large number of cores per unit cross-sectional area as compared with prior art fibres, and thus allows the fibre to have relatively short distances between adjacent cores for a given required inter-core isolation. A fibre so formed has utility in many areas requiring high core density, such as inter-chip optical communication, or optical communication between circuit boards.

5 Claims, 7 Drawing Sheets

U.S. PATENT DOCUMENTS

| | | | |
|---|---|---|---|
| 6,301,420 B1 | 10/2001 | Greenaway et al. | |
| 6,539,155 B1* | 3/2003 | Broeng et al. | 385/125 |
| 7,366,388 B2* | 4/2008 | Roberts et al. | 385/125 |
| 7,532,798 B2* | 5/2009 | Williams et al. | 385/125 |
| 2006/0088260 A1* | 4/2006 | Williams et al. | 385/123 |

FOREIGN PATENT DOCUMENTS

| | | |
|---|---|---|
| GB | 2 387 666 | 10/2003 |
| WO | 03/104155 A1 | 12/2003 |

OTHER PUBLICATIONS

Saval et al., "Splice-less Interfacing of Conventional Fibers to Photonic Crystal Fibers," May 2004, 2 pgs.

Eijkelenborg, "Imaging with Microstructured Polymer Fibre," *Optics Express*, vol. 12, No. 2, Jan. 2004, pp. 342-346.

Saval et al., "Splice-free Interfacing of Photonic Crystal Fibers," *Optics Letters*, vol. 30, No. 13, Jul. 2005, pp. 1629-1631.

International Search Report for PCT/GB2006/001061 mailed Jul. 2, 2006.

Great Britain Search Report for Application No. GB 0506032.2 dated Apr. 26, 2005.

* cited by examiner

MULTIPLE CORE MICROSTRUCTURED OPTICAL FIBRE

This application is the U.S. national phase of International Application No. PCT/GB2006/001061, filed 23 Mar. 2006, which designated the U.S. and claims priority to Great Britain Application No. 0506032.2, filed 24 Mar. 2005, the entire contents of each of which are hereby incorporated by reference.

This invention relates to the field of optical fibres, and in particular to fibres having a plurality of cores.

Multiple core (Multicore) optical fibres have utility in many different areas of technology. When used in communications applications they allow a single fibre to carry different optical signals in parallel, so increasing the data bandwidth of the communication and potentially decreasing the cost per unit of information transmitted. Such communications applications may involve transmission of data across hundreds of miles or across distances more usually measured in centimetres.

Another application is in the field of optical image transfer where a large number of cores are used to transfer light from an image to a remote viewing location. In this application one end of a multicore fibre, or more usually a fibre bundle, is placed such that the image to be transferred falls onto the cores of the fibre(s). The light falling on the cores is then transported to the other end of the fibre(s) where each core will then act as a single pixel for the image at the remote viewing location. See for example "Imaging with microstructured polymer fibre", Martijn A. van Eijkelenborg, Optics Express 342, Vol. 12, No. 2, January 2004.

Another application is in communications between optoelectronic devices such as vertical cavity surface emitting lasers (VCSELs). Such devices may be coupled to digital data streams to enable data transfer between electronic components using optical fibres. The application offers reliable and quick data transfer over comparatively large distances as compared to copper tracks on printed circuit boards. VCSELs are often employed in arrays, enabling parallel data streams to be employed for even greater transfer rates. Other devices such as light modulators may be used as a light source in this application instead of VCESLs. Such light modulators will typically be used with optical fibres designed to preserve the polarisation of light launched into them.

A multicore fibre is disclosed In Electronics Letters, 23 Jul. 1998, Vol 34 No. 15, this fibre being a four-core step-index single mode fibre. The fibre is primarily for telecommunications applications with the purpose of design being "for optical cable densification". Core density is clearly an important issue for such a fibre. Core spacing between adjacent cores for the fibre is 51.8 μm.

Granted U.S. Pat. No. 6,301,420 discloses a multicore photonic crystal fibre comprising a periodic cladding structure formed from a plurality of hollow canes in a triangular matrix with the cores being formed by effectively replacing some of the hollow rods with solid canes. The spacing of the cores in the cladding matrix, i.e. the number of cycles of the periodic cladding structure, is chosen to achieve desired isolation between neighbouring cores. For many purposes, particularly in the communications field, the required spacing between cores will typically be around four or five cycles of the shortest cladding period to ensure suitable core isolation. As the total number of cladding periods is limited in practice by the number of canes that can be stacked in a preform during the fabrication process, this imposes a limit on the number of cores per unit cross sectional area that can be achieved, and this limit may restrict the applications to which the fibre can be put.

PCF fibres such as U.S. Pat. No. 6,301,420, and other microstructured fibres can be made by a "stack and draw method", wherein the cladding and core canes are stacked together in a desired formation, and then pulled into a fibre in a temperature and pressure controlled environment.

According to a first aspect of the present invention there is provided a multicore optical fibre comprising a microstructured cladding material comprising a plurality of cladding elements arranged in an array, and a plurality of core elements, wherein each cladding element is comprised of at least two different materials, each having different refractive indices, characterised in that each core has associated therewith a plurality of cladding elements adjacent thereto, each adjacent cladding element having an apex substantially co-located with every other associated adjacent cladding, element.

An apex of each associated cladding element is taken to be the meeting point of extrapolations from two sides of the cladding element adjacent the core.

The present invention allows the spatial separation of, and number of periods between, adjacent cores to be reduced as compared to the prior art microstructured fibres whilst still maintaining satisfactory isolation between adjacent cores. Thus, a greater density and number of cores per fibre may be obtained.

The cladding elements may comprise cylindrical tubes. When formed into a fibre the tubes may have a lower refractive index inner region, the inner region comprising air, or another gas, or a vacuum. Alternatively the cladding inner region material may comprise a liquid or solid, with a refractive index lower than that of the outer material of the cladding element. The cladding elements preferably form a periodic array, with the core elements being located at interstitial positions within the cladding structure such that the regularity of the cladding is not affected.

The outer material of the cladding may be made from silica, or from any other suitable material. The refractive index of the outer cladding material is greater than the refractive index of the inner cladding material.

The core material may be made from similar material to that of the cladding outer material. Outer region cladding material that is in proximity to the core material before the stack is pulled to form the final fibre will, during such pulling, fuse with the core and become a part of the core material. Each core will then comprise the original core material, along with material from the outer region of a part of the cladding. Each core will be largely surrounded by inner cladding material of lower refractive index, but will be supported by webs of material comprising parts of the outer cladding material that have not formed a part of the core.

The invention allows a core to be formed at each interstitial position in the cladding microstructure. For cylindrical cladding elements stacked in a triangular array, a given cladding element will have six interstitial regions, each of which may form a core in a manner as disclosed herein. The invention therefore provides a means for significantly increasing the density of cores per unit cross sectional area as compared to the prior art.

Each core in a fibre of the current invention will generally be significantly smaller in effective diameter than the diameter of each cladding element, such that it may be located in an interstitial region between adjacent cladding elements.

The cladding elements may be formed into a triangular array, or alternatively may be formed into a square array. A square array has a larger interstitial region in which a core may be located. For a triangular array the cladding elements adjacent a core will each be in contact with all other cladding elements adjacent that core. A triangular array of cladding elements will tend, in a finished fibre, to produce a substantially tessellated hexagonal structure, and core elements may be present without significantly affecting the tessellation. The core elements will tend to be substantially round in cross section before the fibre is initially formed during manufacture, but, due to the manufacturing process, the mechanical and thermal stresses upon it tend to distort the core so that it resembles a standard vertex in the cladding, but with a slight bulge. This can be seen in FIG. 13. Note that, although the core in a finished fibre will not be circular, it will have an "effective diameter" that may be regarded as circular for computer modelling purposes.

Each core element may be incorporated with the cladding elements such that, before the stack is pulled, the cores do not disrupt the regular, periodic nature of the cladding elements. The cores in a finished fibre will also then not disrupt the regularity of the cladding array.

One or more of the cores of the present invention may advantageously be made to transmit radiation in a single mode of propagation. This has the known advantage that modal dispersion—a temporal spreading of the radiation travelling through the fibre—may be significantly reduced.

Note that although a fibre according to the present invention is formed from a series of cladding and core elements, the resulting fibre is more accurately referred to as a microstructured optical fibre rather than a photonic crystal fibre. This is because, for the primary means of propagation, guidance of light in the current invention does not rely on its interaction with a photonic crystal structure in the cladding (i.e. a succession of cycles of differing refractive indices), but instead relies on the difference between the core refractive index and the inner cladding material refractive index. Fibres according to the present invention guiding in this way are therefore index guiding fibres.

The invention provides the advantage that adjacent cores within the fibre may be brought closer together whilst still retaining a given isolation between them. Conversely, sometimes such coupling is desirable, and hence a particularly close spacing—which is simple to achieve with the present invention—can be adopted to give a required coupling coefficient between adjacent cores, up to a maximum when cores occupy adjacent interstitial regions of the cladding structure. Other factors may be used to influence coupling between adjacent cores, such as altering the volumetric ratio of the different materials forming the cladding (i.e. changing the cladding filling fraction), altering the size of the cores themselves, or doping cores to change their refractive index. Any of these factors may be used to produce a fibre having adjacent cores of a required coupling coefficient, within a design range.

A weakly coupled multicore fibre may typically have a coupling constant below approximately 0.02 per metre. This will provide, for a 1 metre fibre with a triangular arrangement of cores, a bit error rate of less than approximately 1 in $10^{12}$. For highly coupled cores, a coupling constant may be arranged to be of the order 100 or 1000 per metre.

The invention is particularly suited to producing fibres having the aforementioned properties whilst being able to transmit light in a single mode of propagation.

The number of cores in the fibre may be at least 2, such as at least 4 such as at least 8 such as at least 20 such as at least 50 such as at least 100 such as at least 200 such at least 500 cores.

The relative core arrangement may advantageously be adapted such that, in a pulled fibre, the spacing matches that of an array of light sources, such as VCSELS or light modulators, or an array of receivers. Such arrays of sources or receivers are often formed on a single substrate, and have a standardised relative spacing.

According to a second aspect of the present invention there is provided an optical fibre comprised of a plurality of cladding elements each cladding element having a higher index region and a lower index region, with interstitial regions formed between said cladding elements, characterised in that core material is positioned in a plurality of the interstitial regions so as to form a plurality of core regions.

Preferably, the cross-sectional area of each interstitial region is significantly smaller than the cross-sectional area of each cladding element. Preferably each core region has a cross-sectional area significantly smaller than that of each cladding element.

According to a third aspect of the present invention there is provided a method of making a multicore optical fibre comprising the steps of:
i. assembling a plurality of canes into a stack, each cane having a higher index region and a lower index region, the canes having interstitial regions there between when assembled;
ii incorporating into two or more of the interstitial regions in the assembly a core material, the core material not affecting the positions of adjacent canes;
iii pulling the stack of canes incorporating the core material into a fibre.

After the pulling process, the canes act as an array of cladding elements, whereas the core material forms core regions within the cladding element array.

Known modern fibre pulling methods are able to substantially eliminate the interstitial regions of microstructured fibres, such that material surrounding an interstitial region closes in to fill these regions, these regions then going on to become a vertex in the cladding structure. Inserting core element material into the cladding interstitial regions during the manufacturing phase may create further, secondary interstitial regions around this core element material. During the pulling process these secondary interstitial regions may be eliminated using the same known techniques, such that the core material may fuse with a part of the outer cladding material to form a larger core region substantially free from artefacts of the secondary interstitial regions.

Note that herein the term "interstitial" refers to the regions between adjacent cladding elements in the fibre in its unpulled state. When used in the context of a fibre that has been pulled, it refers to those parts of the fibre where the interstitial regions would have been in the unpulled fibre.

For certain applications it is advantageous for the fibre to preserve the polarisation of light passing along it. To this end, during the production of the fibre the structure may advantageously be arranged to be birefringent.

The fibre may be formed such that the cladding elements are each of a different overall dimension in one transverse axis as compared to another transverse axis. Preferably, the structure may be elliptical. One technique for forming such a structure is to squeeze the fibre in one axis during pulling process to produce an elliptical structure of the desired characteristic. Alternatively, the fibre may be formed using elements that are of a non-circular cross-section so that any additional shaping during the pulling phase is not necessary. Alternatively, the fibre may be formed using cladding canes that have different ratios of higher index region to lower index region, i.e. having different filling fractions. By arranging the fibre to have cladding materials of differing filling fractions in different regions of the cross-sectional area of the fibre, birefringence can be obtained.

The current invention has an advantage over the prior art in that a multicore fibre can be produced having a greater number of cores per unit cross sectional area using conventional fibre pulling equipment. Furthermore, the optical isolation between adjacent cores is greater for a given physical separation distance as compared to the prior art. This makes the invention more suitable to particularly high density packing of the fibre cores.

A fibre according to the present invention may be made from any suitable material. Typically the fibre will be made from silica, but other materials, such as chalcogenide, fluoride or lead glasses, or suitable polymer materials may also be used.

The invention will now be described in more detail, by way of example only, with reference to the following Figures, of which:

FIG. 1 diagrammatically illustrates a multicore optical fibre of the prior art;

FIG. 2 diagrammatically illustrates a second multicore optical fibre of the prior art, this fibre employing a photonic crystal cladding structure;

FIG. 3, diagrammatically illustrates a detailed view of the cladding and core of a prior art photonic crystal fibre both before and after the pulling process;

FIG. 4 diagrammatically illustrates a preform and final core and cladding structure of a first embodiment of the current invention, the Figure showing a transverse cross-sectional representation of the fibre;

FIG. 5 diagrammatically illustrates two embodiments of the present invention, showing different core layouts;

FIG. 6 diagrammatically illustrates an embodiment of the present invention wherein the fibre is arranged to exhibit birefringence;

FIG. 7 diagrammatically illustrates an embodiment of the present invention wherein the fibre is arranged to have different sized cores;

FIG. 8 diagrammatically illustrates an embodiment of the present invention wherein the cladding structure of the fibre is arranged in a square formation;

Figure 13:
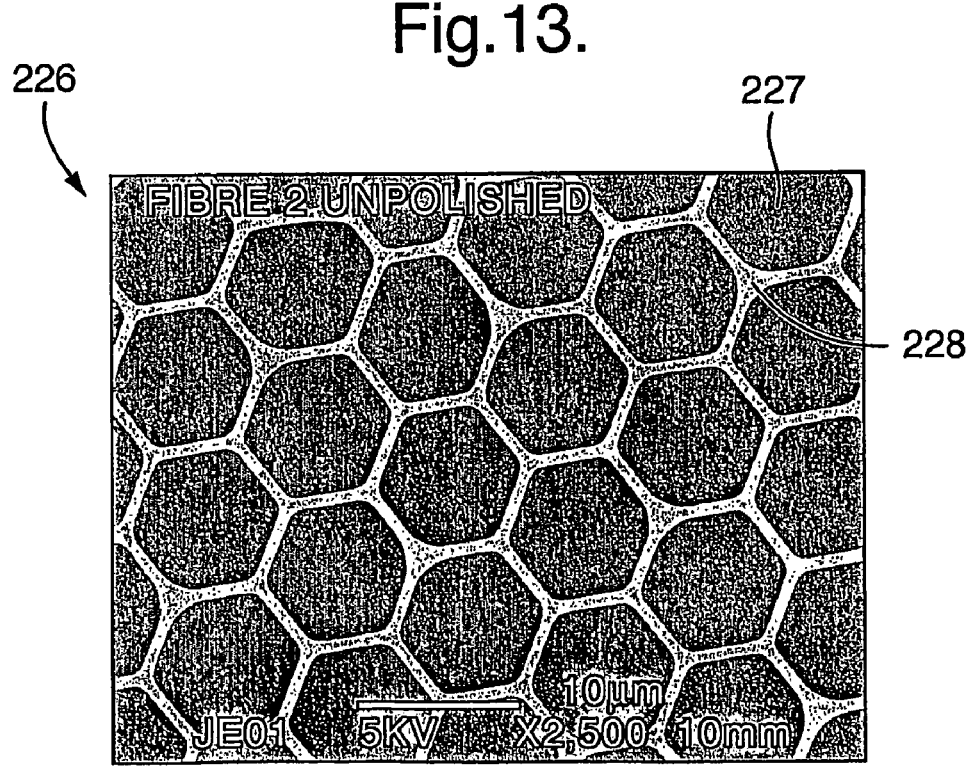
Figure 11:
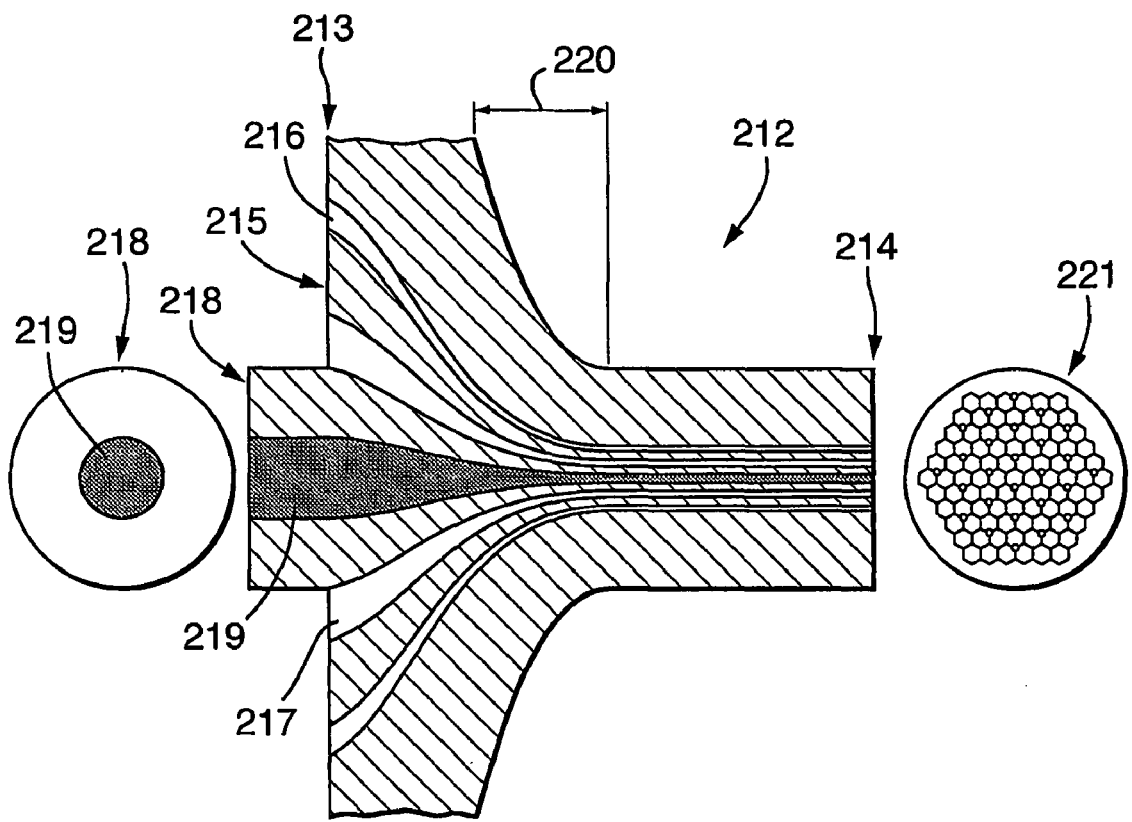
Figure 12:
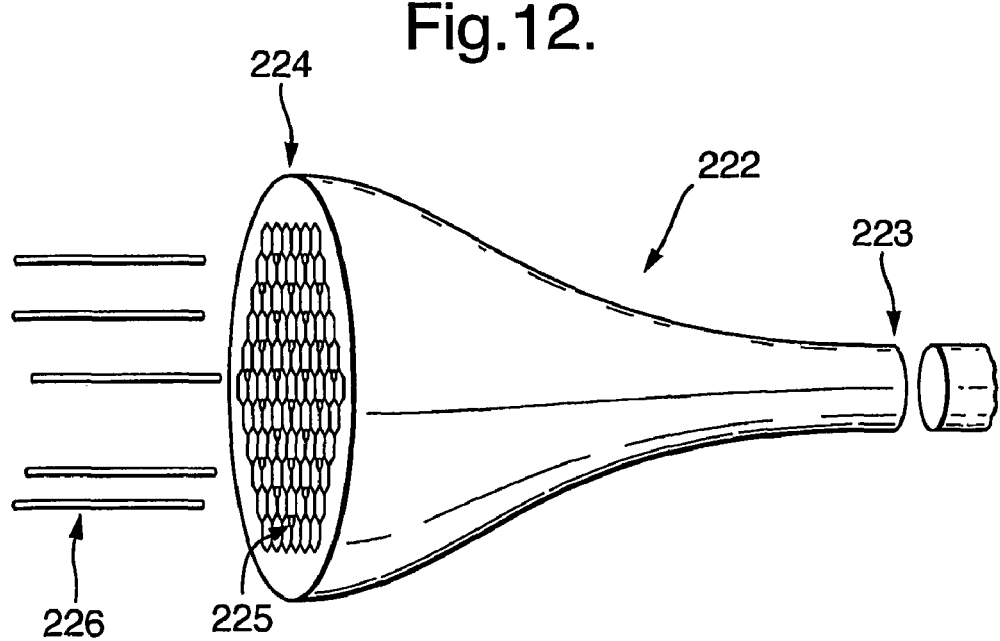

FIG. 11 diagrammatically illustrates an embodiment of the present invention wherein a fibre is arranged to have a tapered profile along its longitudinal axis with a single mode fibre having been positioned in an interstitial region during manufacture;

FIG. 12 diagrammatically illustrates another embodiment of a tapered fibre according to the present invention wherein a large diameter end of the fibre is arranged to have cores of a size to allow convenient coupling to a conventional single mode fibre; and FIG. 13 shows a Scanning Electron Microscope (SEM) image of a fibre of the present invention.

Figure 1A:
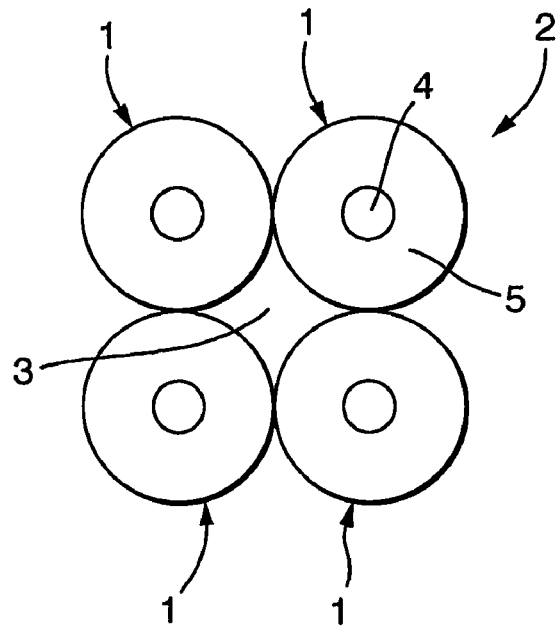
Figure 1B:
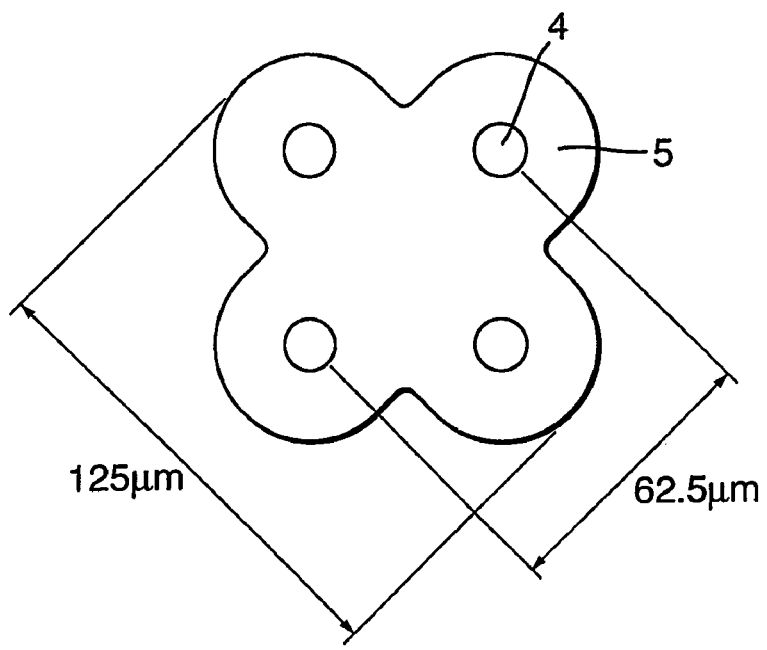

FIG. 1 shows a fibre preform used in the manufacture of a prior art index guiding multicore fibre, in a state before a drawing or pulling process, in FIG. 1a, and in a state after the drawing, in FIG. 1b, this being a finished fibre. The fibre is made by a process of mechanically cutting a single fibre preform 1 into four, and arranging the four conventional and identical preforms 1 as shown to produce a 2×2 fibre preform 2, with the single preforms 1 in contact as shown, and leaving an interstitial gap 3. Each preform 1 comprises a higher index region 4 forming the core, and a lower index region 5 that forms the cladding. The 2×2 preform is then drawn in a conventional manner into a fibre having the required dimensions. This drawing process also fuses the individual preforms 1 together, and also ensures that the interstitial gap 3 is either totally or substantially eliminated. The drawn fibre is shown in FIG. 1b. The overall diameter of the pulled fibre is 125 µm—a standard size in optical fibre production—with a diagonal separation of the cores of 62.5 µm.

The production technique described in relation to FIG. 1 can be adapted to produce more cores, although this gets more difficult as the number of cores is increased. Standard fibre pulling equipment incorporates jigs designed to take certain sized preforms, and so if preforms are made that do not match the pulling jigs then the production process becomes more costly as specialised jigs will be required. This imposes an economic and practical limit on the number of cores that can be incorporated into a fibre of this type while still being capable of being formed into a fibre of 125 µm overall diameter.

Figure 2:
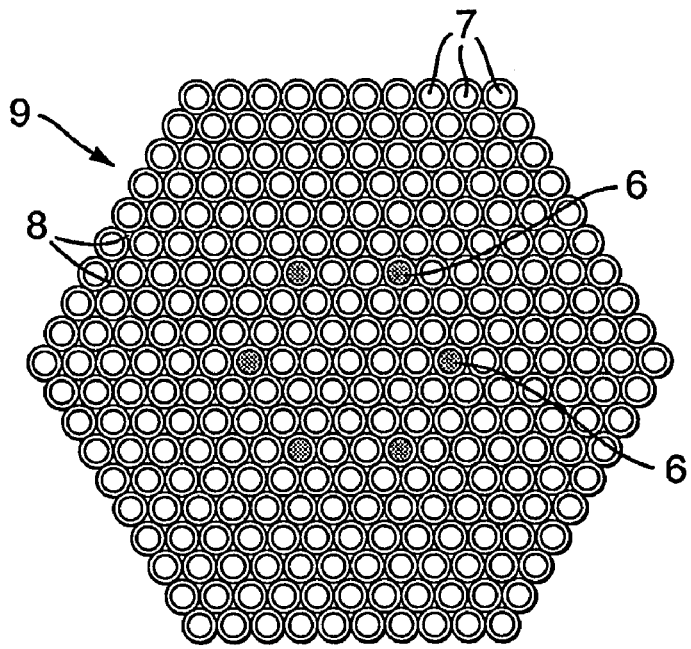

FIG. 2 shows a prior art photonic crystal fibre as described in U.S. Pat. No. 6,361,420. The fibre comprises a plurality of cores 6, each core 6 surrounded by a plurality of cladding elements 7. Each cladding element 7 comprises a hollow cylindrical tube. A plurality of such tubes 7 are positioned in a triangular arrangement as shown to form a cladding. Interstitial regions 8 exist between adjacent cladding elements at this stage. Each core region 6 is formed by positioning a solid cylindrical cane in place of a cladding tube 7, the cane having a diameter equal to that of a single cladding element.

During manufacture an assembly of core 6 and cladding elements 7 as described above forms a preform 9, which is then pulled in conventional manner to produce a microstructured fibre of a desired size. During the pulling process the forces on the materials tends to result in the cladding tubes 7 forming a hexagonal structure, with the interstitial regions being completely or substantially eliminated due to the pressures present on the fibre during the pulling. Optical isolation between adjacent cores 6 is dependent upon the number of cladding elements that separate the cores. If the application to which the fibre is to be put does not require a great deal of isolation then more cores per unit area may be employed; however, for many applications three or four cladding element repetitions are required between core elements 6.

It is relatively straightforward to generate multicore fibres with this technology, as described above—hollow tubes are replaced by solid rods when the fibre preform is assembled. However, there is a limit on the ratio of cores to cladding tubes that can be used in such a fibre whilst still maintaining a required degree of isolation between adjacent cores. This results in a relatively modest maximum number of cores being achievable using standard fibre pulling machinery and standard 125 µm overall fibre diameters.

Figure 3A:
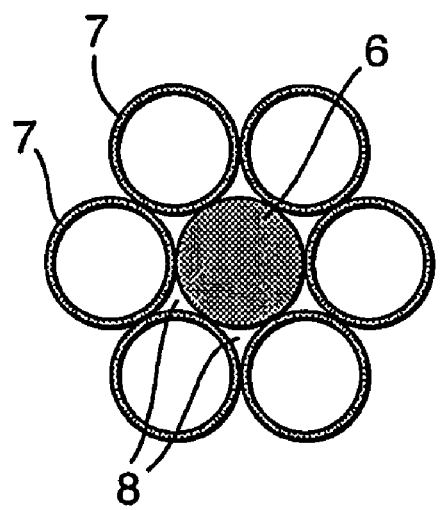
Figure 3B:
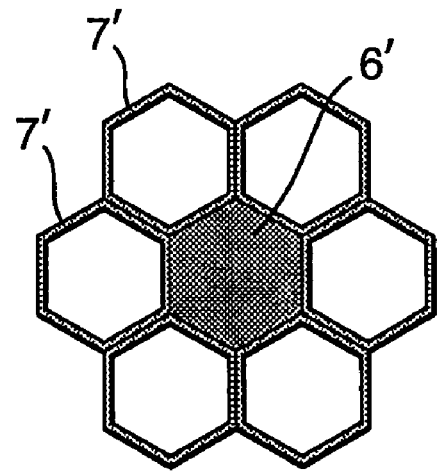

FIG. 3 shows a detailed view of a core of the type of fibre shown in FIG. 2, and the surrounding cladding structure both before (in FIG. 3a), and after (FIG. 3b) the pulling process. As can be seen, the fibre is a high air filling fraction fibre. Clearly the latter figure is not shown to the same scale as the former, due to the significant reduction in fibre diameter that takes place during the pulling process. FIG. 3a shows a core 6 surrounded by cladding tubes 7, with interstitial gaps 8 existing between adjacent elements. This represents a part of a preform. FIG. 3b shows the same elements, but after having been passed through a fibre pulling process. Core 6' has been transformed from a circular form to hexagonal form due to the heat and physical forces involved during the process. Also, cladding elements 7' have likewise been transformed into hexagonal structures for the same reasons. It will be noticed that the interstitial regions 8 present in FIG. 3a have completely disappeared as a result of the pulling process.

Figure 4A:
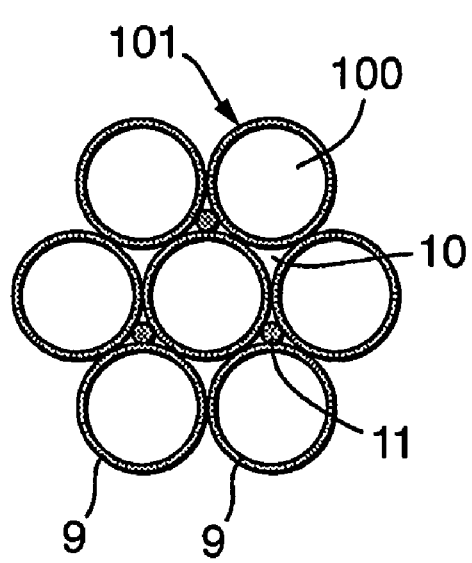
Figure 4B:
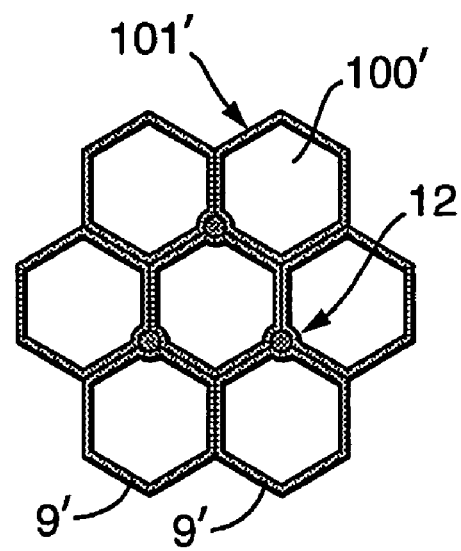

FIG. 4 shows a first embodiment of the present invention. FIG. 4a shows a part of a preform for a fibre, and FIG. 4b shows the same part after the pulling process has been done. Again the two parts are shown at differing scales.

FIG. 4a shows an end-on view of a part of a preform that, when pulled in a conventional manner, will result in a multicore fibre of the first embodiment. Circular hollow silica canes 9 are shown stacked into a regular, triangular array. Each cane 9 comprises a lower refractive index material inner region 100, surrounded by a higher refractive index outer region 101. Interstitial regions 10 exist between adjacent canes. Into some of these interstitial regions, e.g. 11, have been placed solid rods of core material that partially fill the interstitial region. The partially filled interstitial regions 11 will, when the preform is pulled into a fibre, result in a core region being formed. As described above, the pulling process substantially removes the interstitial regions, and adjacent parts of the preform will fuse together to form a fibre.

The cross sectional area of the interstitial region between adjacent stacked canes in a preform will depend, for a given cane diameter, on the stacking arrangement used. The fibre of FIG. 4 has a triangular stacking arrangement, which gives a minimal interstitial area. If a larger area is desired, so as to allow larger cores to be made, then an alternative stacking arrangement, such as a square stacking arrangement, may be used.

FIG. 4b shows the fibre after having been through the pulling process. Each of the silica canes 9' have been transformed into a hexagonal form due to the pressures and temperatures present during the pulling process. Interstitial regions e.g. 10 present in the preform have disappeared. Interstitial regions e.g. 11 containing a core rod have formed into a core 12 of the fibre, formed from the core rod material itself, and also the immediately adjacent cladding material. The result is a core region 12 capable of radiation guidance. Each such core region 12 is substantially surrounded by the region of lower refractive index of the cladding material 100', but each core 12 has three supporting webs formed from a part of the cladding higher index material 101'.

As each interstitial region of the original preform is able to be formed into a core in this manner, the density of cores per unit cross sectional area can be considerably increased over that of the prior art. However, for some applications it may not be advantageous to use every possible interstitial position as a core, as this may result in cross-talk between adjacent cores above acceptable limits for a given application.

Figure 5A:
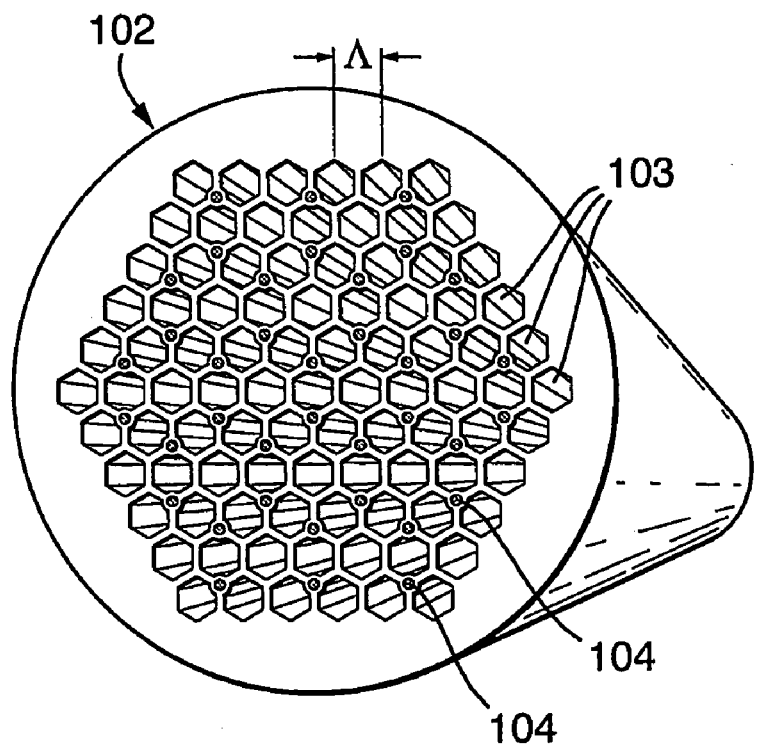

The diameter of the cores and their relative spatial separation will vary depending upon the application to which a fibre is to be put. FIG. 5 shows two fibre designs each having a different core arrangement. FIG. 5a shows a fibre 102 comprising a triangular arrangement of canes 103 forming the cladding and having a core 104 positioned in the interstitial region of two opposite corners of every other cane 103 in a row for each alternate row of canes 103 in the fibre 102. The fibre 102 has a minimum distance between adjacent centres of cladding elements (periodicity, Λ) of 3.5 μm and an air filling fraction f of 0.9. The total core diameter (including the part of the core made up by what would be cladding material before pulling) is 740 nm, and core separation is 4 μm. Such a fibre has a core packing density of approx. 47000 cores per square mm.

Figure 5B:
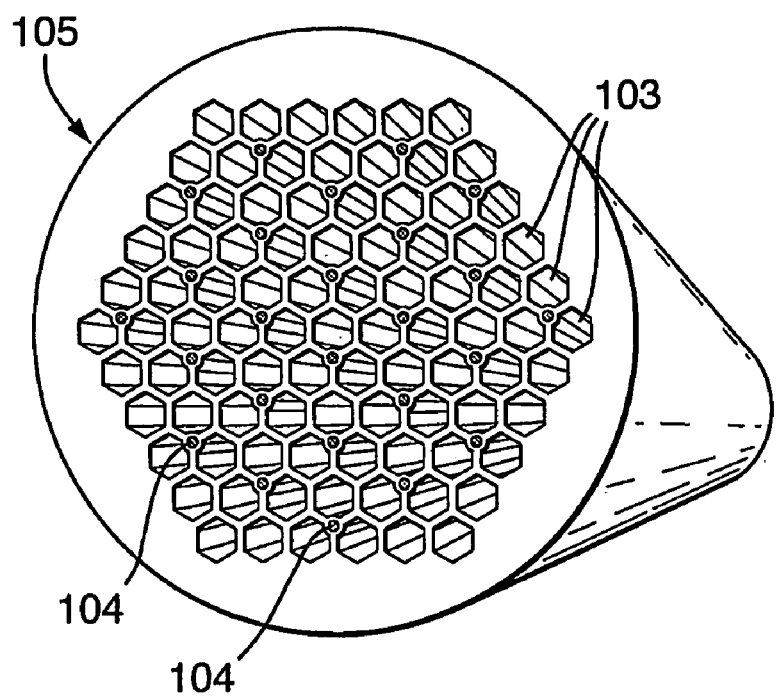

FIG. 5b shows a second fibre 105 having a sparser array of cores 104 per unit area, and per number of cladding elements 103. This again has a triangular arrangement of cladding elements 103, forming rows, but has a single core 104 positioned adjacent to every third cladding element 103 on each row. Thus the cores 104 are in a triangular lattice arrangement. The fibre 105 has a minimum distance between adjacent centres of cladding elements (periodicity, Λ) of 9 μm and an air filling fraction f of 0.65. The total core diameter (including the part of the core made up by what would be cladding material before pulling) is 3.2 μm. Core separation is nominally 15.625 μm, equal to three times the side of the hexagon formed by each cladding element. Such a fibre has a core packing density of approx. 4730 cores per square mm.

Figure 6A:
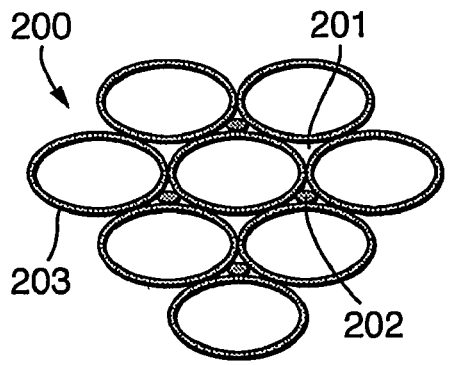
Figure 6B:
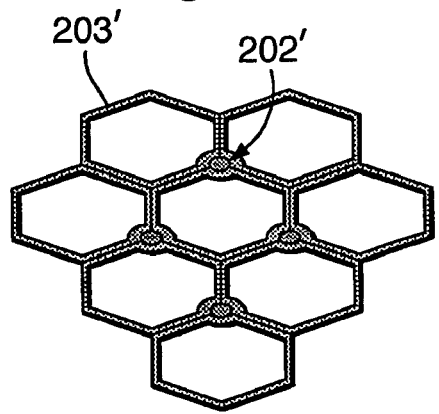

FIGS. 6 to 8 shows three further embodiments of the present invention. FIG. 6 shows a birefringent fibre both before (FIG. 6a) and after (FIG. 6b) the pulling stage. FIG. 6a shows a matrix of cladding canes 200 arranged in a triangular lattice, with some interstitial regions 201 having core elements 202 therein. Each cladding cane 203 is elliptical in cross-section before the pulling stage. The non-circular cross-section gives a degree of birefringence to the completed fibre. FIG. 6b shows the stack of canes 200 at FIG. 6a after the pulling process. The elliptical cross-section of the unpulled canes 203 becomes an irregular hexagon 203' after pulling. In effect, the hexagonal lattice of the embodiment shown in FIG. 4 has effectively been distorted in one axis. A similar effect can be achieved by using circular canes during the stacking phase of manufacture, and then squeezing the fibre in one axis during the pulling phase. The core elements 202 in FIG. 6a become cores 202' in the pulled fibre in the usual way as described above.

A further advantage of the fibre of FIG. 6 is that, by selecting an appropriate degree of distortion from the circular cross-section, the distribution of cores in the finished fibre can be arranged to be on a square lattice. This arrangement is particularly convenient for aligning the cores with optical sources or detectors that themselves are on a square lattice. For the core arrangement shown in FIG. 6, a reduction in one axis of a factor √3 will give a square lattice of cores.

Figure 7A:
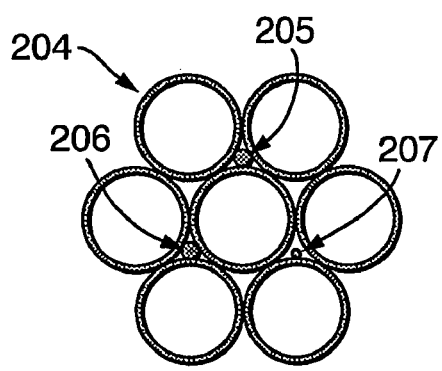
Figure 7B:
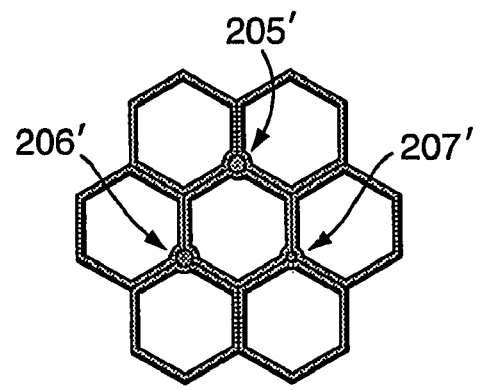

FIG. 7 shows a further embodiment of the present invention. Again FIG. 7a shows a stack of canes 204 before pulling, and FIG. 7b shows the equivalent fibre cross-section after the pulling process. Referring to FIG. 7a, cladding canes 204 are arranged in a triangular matrix. Core elements 205, 206, 207 are positioned in interstitial regions between cladding elements as described above. Two of the core elements 205, 206 are of the same size, whilst the third core 207 has a smaller diameter. Clearly, after the pulling process the core 207' is smaller than the two other cores 205', 206'. The provision of different sizes of cores in this manner gives an extra degree of freedom in the design of the fibre, and can be used to change the modal properties of the cores, the coupling properties of adjacent cores, or can adapt the non-linear behavioural properties of cores.

Figure 8A:
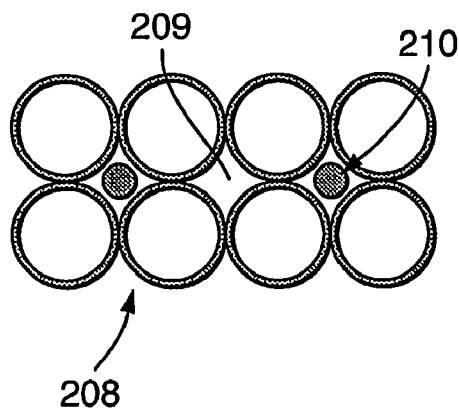
Figure 8B:
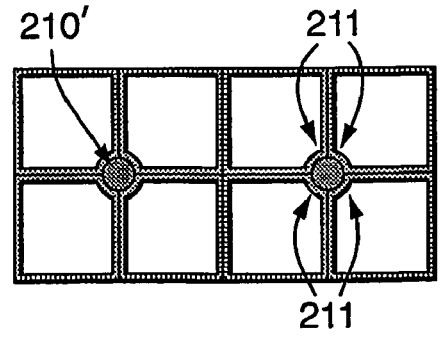

FIG. 8 shows an example of an alternative to the triangular lattice cladding structure shown in the above examples. Here, cladding elements 208 have been arranged in a square lattice. This arrangement gives a larger interstitial region 209, thus allowing larger core elements 210 to be used without disrupting the periodicity of the cladding. FIG. 8a shows the stack before pulling, and FIG. 8b shows the resultant fibre after the pulling process. FIGS. 7b and 8b are shown to an approximately similar scale, and it can clearly be seen that the core 210' diameter of FIG. 8b is greater than that of FIG. 7b. Of course, different sized cores can be used with the square configuration of this embodiment, as described above in relation to a triangular cladding arrangement. Thus a larger variation of core size is possible with this cladding arrangement. A further difference with the embodiment of FIG. 8 is that each core now has four webs supporting it, compared to the three webs present in a fibre having a triangular cladding lattice.

The optical fibres of the current invention may be modelled using known modelling techniques. Prior art PCF fibres, such as those shown in FIG. 2, are often modelled using a step-index fibre model with an approximate effective cladding index given by a scalar theory. See for example section 3.2 of the book "Photonic Crystal Fibres", Bjarklev et al, Kluwer Academic Publishers, 2003. For a given structure it is possible to calculate the number of modes supported by a core, and also the coupling between adjacent cores, given two main parameters, these being the periodicity Λ and the air filling fraction f. For maximum isolation between cores, single mode transmission is desirable, which generally places an upper limit on the periodicity for a given wavelength of operation. If the transmission mode is kept unchanged, the coupling between cores scales inverse exponentially with the distance between the cores.

A particular prior art PCF fibre modelled using the above technique required cores with a sufficiently small coupling that five periods were required between cores for an air-filling fraction of approximately 0.2, and with a periodicity of 6.25 μm. For low air filling fractions, the effective index of the cladding a PCF fibre of this type varies as the operating wavelength changes so as to maintain single mode transmission. This also means that if the structure (core size and periodicity) is scaled in size, the transmission mode remains almost unchanged. However, the coupling between cores does not remain the same as the structure scales. Thus reducing the scale of a fibre of the prior art will tend to increase the coupling between adjacent cores. Thus prior art fibres cannot have the core density increased by scaling without having undesired effects on the fibre properties. Reducing the scale would therefore mean increasing the number of periods between cores or an increase in air filling fraction to produce more mode confinement.

Figure 9:
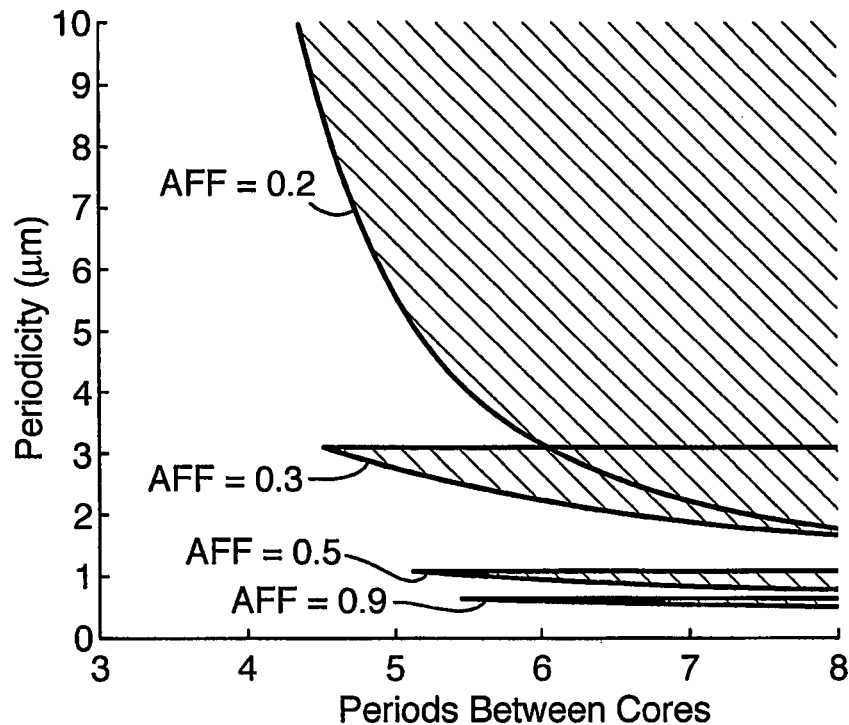
FIG. 9 shows a graph indicating the range of physical properties a prior art PCF fibre must have in order to remain single mode, as modelled by an "effective index" method.

FIG. 9 shows this in graphical form, with the shaded regions indicating where single mode transmission may occur. It can be seen that at least five cladding periods are needed between adjacent cores, but there is some flexibility in adapting the air filling fraction so as to be able to reduce the periodicity. However, the range of periodicities over which such a fibre would stay single mode narrows, so making fabrication difficult. The figure represent a PCF prior art fibre designed to have a bit error rate of $10^{-12}$ over a 1 m length at an operating wavelength of 850 nm.

Figure 10:
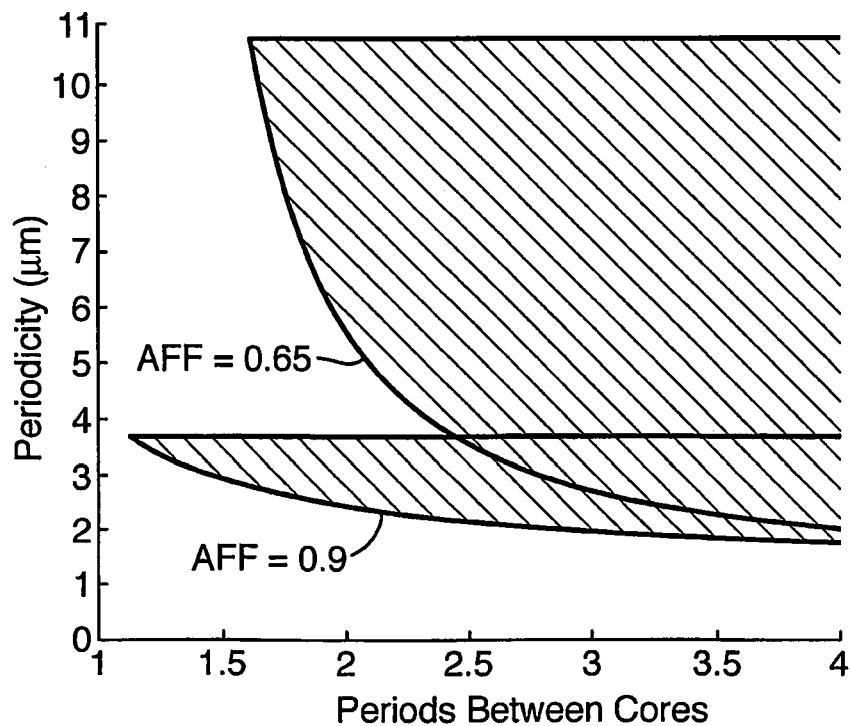
FIG. 10 shows a graph indicating the range of physical properties the fibre of the current invention as shown in FIG. 5 needs to have in order to remain single mode, as modelled by an "effective index" method.

FIG. 10 shows a similar graph, but this time for a fibre according to the present invention. The fibre of FIG. 5b has been modelled using similar techniques used in the prior art. The core diameter was taken to be the diameter of the interstitial rod used to form the core, added to the thickness of a silica bridge. This gives a core diameter of approximately $(1.16-\sqrt{f})\Lambda$. Thus the core size depends on the air filling fraction, with smaller cores for higher values. As with the prior art fibre, a single mode of transmission will give the least amount of coupling between cores, leading to an upper limit on the periodicity as shown in the figure. However, as the cores in the present invention are small in relation to the cladding periodicity, it is possible to achieve the necessary optical isolation with a distance between cores of less than twice the periodicity, as shown in FIG. 10. Increasing the air filling fraction allows smaller cores with a smaller number of periods between adjacent cores.

The effective index model of analysis and modelling can not yet provide a rigorous analysis of either the PCF prior art, or of the current invention. One thing it does not model well is the webs that support each core. However, it is accurate enough to provide a good indication as to the expected performance of a fibre of the present invention.

A multicore fibre of the present invention may incorporate cores doped with a material to change the optical properties of the core. In particular, a dopant may be used to after the normal refractive index of the core material, or may be used to enhance non-linear properties of the core. Doping of the core may be conveniently done by doping the core rods (11 of FIG. 4a) before assembly of the preform.

A fibre having one or more cores doped in this manner opens up the applications to which the fibre may be put. It is known that PCF fibres with high air-filling fractions and small cores may be used in non-linear and solution physics to generate, for example, white light. This requires the positioning of the zero group velocity dispersion to near the pump wavelength. This design may have advantages for such applications at visible wavelengths. With a multiplicity of cores it may be possible to induce coupling with a precision required to allow the transfer of energy between cores.

Non linear behaviour within a fibre can be induced without doping, if the intensity of the illumination source is high enough to excite the materials within the fibre sufficiently. For example, "white light" or super-continuum generation can occur if the optical intensity in the fibre is greater than a threshold determined by the material properties. Four-wave mixing can also be done in a similar manner. The present invention is particularly suited to applications requiring non-linear behaviour, as the coupling between cores can be controlled to a high degree using a number of methods as described above. Design degrees of freedom that influence the coupling include the spacing of adjacent cores, the core size, core dopants, and the ratio of the quantities of the different materials making up the cladding elements.

Fibres may also be made according to the present invention with differing core densities in different regions of the fibre cross section. This can allow the same fibre to be used for different purposes. For example, one part of the fibre could be used in a non-linear mode, whereas another part could be used to transfer data along relatively highly isolated channels.

FIG. 11 shows a further embodiment of the present invention. A microstructured fibre is formed as following the techniques as described above. A stack is created comprising cladding elements and core elements. However, the difference with this embodiment is that at least one of the core elements comprises a single mode fibre. This fibre is positioned at an interstitial region as before, but takes the place of the core element at that region. The stack incorporating the single mode fibre is then drawn down in a tapered fashion to form a structure similar to that shown in FIG. 11. Here, a fibre 212 is shown diagrammatically in cross section. The fibre 212 has a diameter that tapers from a large diameter end 213 to a small diameter end 214. The taper is generally not linear along the length of the fibre. The wider end 213 has regions 215, 216 corresponding to areas of high and low refractive index in the cladding and core elements. One such low refractive index region is interstitial region 217. A conventional single mode fibre 218, such as an index guiding fibre itself having a core defined by a doped region 219 is placed, during manufacture, into interstitial region 217. A pulling process adapted to produce a taper along the fibre is carried out, with the smaller end of the fibre 214 becoming essentially a fibre as described in relation to FIGS. 4-8. The single mode conventional fibre 218 protrudes from the end face of the microstructured fibre structure 213 and, as at that point it is a standard single mode fibre, may be coupled to an optical source, or spliced to another fibre, in a known manner. This allows convenient coupling to sources or receivers that may not be in a convenient format for other types of connection. The tapered portion of the fibre 220 is arranged to taper adiabatically to ensure that light entering core 219 remains single mode during its passage along the fibre 212. After the taper the fibre 218 acts as a core according to the present invention as described in relation to FIGS. 4-8 above. A cross-section of the end 214 of the fibre is shown 221, having a core and cladding structure similar to that of FIG. 5. Although only a single conventional single mode fibre has been shown incorporated into the fibre 212, generally there will be many such fibres, so allowing conventional coupling arrangements from them to a plurality of cores formed in the interstitial regions of the other end 214 of the fibre 212. Further details of this technique but as applied to conventional photonic crystal fibres can be found in "Splice-free interfacing of photonic crystal fibres", Leon-Saval et al, Optics Letters, 1.7.05, Vol. 30 No. 13.

FIG. 12 shows another embodiment of a tapered fibre. Here, a fibre 222 is formed in a manner described in relation to FIG. 4a above, but wherein the fibre 222 is pulled in a tapered fashion as described in relation to FIG. 11. A narrow diameter end 223 of the fibre 222 is as described in relation to FIG. 4b, whilst a large diameter end 224 has a diameter such that each core region e.g. 225 is of a size such that it may conveniently be coupled to a conventional single mode fibre 226. Such a fibre 222 has benefits in allowing convenient coupling to standard single mode fibres, and also has application in photonic signal processing applications. See for example "Microstructure Fibre Array for RF Photonic Signal Processing Applications", Electronics Letters, Vol 42, No. 5.

FIG. 13 shows an SEM of a portion of an end-face of a fibre made according to the present invention. The fibre is made entirely from silica and has cladding elements 227 arranged in a hexagonal lattice, with a cladding periodicity of 9 µm. A hexagonal lattice in a pulled fibre equates of course to a triangular lattice in an unpulled fibre. Cores 228 are positioned at various points throughout the lattice in a regular array, each being spaced nominally 15.625 µm from adjacent cores. In this embodiment all cores 228 are the same size.

The skilled person will be aware that other embodiments within the scope of the invention may be envisaged, and thus the invention should not be limited to the embodiments as herein described.

The invention claimed is:

1. A method of making a multicore optical fibre comprising the steps of:
   i. assembling cladding elements comprising a plurality of canes into a stack to form a regular periodic array, each cane having a higher index region and a lower index region, the canes having interstitial regions there between when assembled;
   ii incorporating into two or more of the interstitial regions in the assembly a core material, the core material not affecting the positions of adjacent canes;
   iii pulling the stack of canes incorporating the core material into a fibre wherein each core material is substantially surrounded by the lower index region of the cladding elements, the core material in the pulled fibre comprising the incorporated core material and the immediately adjacent cladding material.

2. A method as claimed in claim 1 wherein, whilst pulling the stack of canes, pressure is applied in one transverse axis such that the finished fibre has cladding elements of different overall dimension in one transverse axis as compared to another transverse axis.

3. A method as claimed in claim 1 wherein the canes have different overall dimension across one transverse axis as compared to another transverse axis.

4. A method as claimed in claim 1, wherein the core material is itself an optical fibre.

5. A method as claimed in claim 1 wherein the step of pulling the stack of canes into a fibre is adapted to pull the stack such that the resulting fibre has a tapered diameter along at least a part of the length of the fibre.

* * * * *